US007933467B2

(12) United States Patent
Chang et al.

(10) Patent No.: US 7,933,467 B2
(45) Date of Patent: Apr. 26, 2011

(54) APPARATUS AND METHOD FOR CATEGORIZING IMAGE AND RELATED APPARATUS AND METHOD FOR DE-INTERLACING

(75) Inventors: Ching-Hua Chang, Taipei Hsien (TW);
Po-Wei Chao, Taipei Hsien (TW);
Wen-Tsai Liao, Taipei Hsien (TW)

(73) Assignee: Realtek Semiconductor Corp., Hsinchu (TW)

( * ) Notice: Subject to any disclaimer, the term of this patent is extended or adjusted under 35 U.S.C. 154(b) by 1062 days.

(21) Appl. No.: 11/693,688

(22) Filed: Mar. 29, 2007

(65) Prior Publication Data
US 2007/0237400 A1     Oct. 11, 2007

(30) Foreign Application Priority Data
Apr. 11, 2006   (TW) ................................ 95112856 A

(51) Int. Cl.
*G06K 9/48* (2006.01)
*G06K 9/56* (2006.01)
(52) U.S. Cl. ..................... 382/266; 382/275; 382/300
(58) Field of Classification Search .................... None
See application file for complete search history.

(56) References Cited

U.S. PATENT DOCUMENTS

| 5,029,108 | A | 7/1991 | Lung |
| 6,614,484 | B1 * | 9/2003 | Lim et al. .................. 348/448 |
| 6,799,168 | B1 | 9/2004 | He |
| 2003/0193486 | A1 | 10/2003 | Estrop |
| 2004/0075764 | A1 | 4/2004 | Law |
| 2007/0070244 | A1 * | 3/2007 | Wyman et al. .............. 348/448 |

FOREIGN PATENT DOCUMENTS

| JP | 2000-224551 | 8/2000 |
| JP | 2005-208613 | 8/2005 |

* cited by examiner

*Primary Examiner* — Brian P Werner
(74) *Attorney, Agent, or Firm* — Thomas, Kayden, Horstemeyer & Risley, LLP

(57) ABSTRACT

The present invention provides an apparatus and a method for de-interlacing. The apparatus includes an edge detection module, a statistics module, and an interpolation circuit. The edge detection module performs an edge detection operation on a plurality of pixels of an image so as to generate edge information corresponding to the image. The statistics module performs a detection window based statistics operation on the edge information so as to generate statistics information corresponding to the image. The interpolation circuit interpolates the image according to the statistics information so as to generate an intra-field interpolation signal corresponding to the image.

20 Claims, 9 Drawing Sheets

| Statistics results | Categorizing the pixels |
|---|---|
| ■ > TH2 | Smooth area |
| (□+■-▰)> TH1 && [(▰+■)>= TH2 \| \| (▰+■)>= TH2 \| \| (▰-□)>= TH2]&&(■+◣)<(25-TH1) Or (□+■-◣)> TH1 && [(◣+■)>= TH2 \| \| (◣+■)>= TH2 \| \| (◣-□)>= TH2]&&(■+▰)<(25-TH1) | Vertical edge |
| (■+■-▰)> TH1 && [(■+■)>= TH2 \| \| (■+▰)>= TH2 \| \| (■-▰)>= TH2]&&(□+◣)<(25-TH1) Or (■+■-◣)> TH1 && [(■+■)>= TH2 \| \| (■+◣)>= TH2 \| \| (■-◣)>= TH2]&&(□+▰)<(25-TH1) | Horizontal edge |
| Other |  | Mess area |
| Note: ■ Statistical pixel number of non-edge  □ Statistical pixel number of vertical edge  ■ Statistical pixel number of horizontal edge  ◣ Statistical pixel number of left tilted edge  ▰ Statistical pixel number of right tilted edge | |

| Statistics results | Categorizing the pixels |
|---|---|
| ■ > TH2 | Smooth area |
| (■+■+◨)>> TH1 && [((◨+■)>= TH2 \|\| (◨+■)>= TH2 \|\| (◨+■)><(25-TH1)) Or (■+■+◧)>> TH1 && [((◧+■)>= TH1 \|\| (◧+■)>= TH2 \|\| (◧+■)><(25-TH1))] | Vertical edge |
| (■+■+◧)>> TH1 && [((◧+■)>= TH2 \|\| (◧+■)>= TH2 \|\| (◧+■)><(25-TH1)) Or (■+■+◨)>> TH1 && [((◨+■)>= TH2 \|\| (◨+■)>= TH2 \|\| (◨+■)><(25-TH1))] | Horizontal edge |
| Other | Mess area |

Note
■ Statistical pixel number of non-edge  ▨ Statistical pixel number of vertical edge  ▧ Statistical pixel number of horizontal edge
◧ Statistical pixel number of left tilted edge  ◨ Statistical pixel number of right tilted edge

Fig. 3

APPARATUS AND METHOD FOR CATEGORIZING IMAGE AND RELATED APPARATUS AND METHOD FOR DE-INTERLACING

BACKGROUND OF THE INVENTION

1. Field of the Invention

The present invention relates to an image processing method, and more particularly, to a method that utilizes image categorizing techniques for image de-interlacing.

2. Description of the Prior Art

Please refer to FIG. 1. FIG. 1 is a system block diagram of a conventional de-interlacing apparatus 100. The de-interlacing apparatus 100 includes an edge detection apparatus 110 and an interpolation circuit 120. The edge detection apparatus 110 receives an input image P_in (for example, the input image P_in can be a field of a video data, wherein the field corresponds to a frame, and the input image P_in only includes a portion of scan lines of the frame), and then performs an edge detection operation on the input image P_in to generate edge information leg corresponding to the input image P_in. Next, the back stage interpolation circuit 120 performs an interpolation on the input image P_in according to the edge information I_eg, in order to generate a portion of missing scan lines in the image P_in, so as to generate an output image P_out corresponding to the input image P_in (the output image P_out includes the portion of missing scan lines in the input image P_in). However, the conventional method does not always accurately perform the interpolation on the input image according to the edge information of the image, and therefore the de-interlacing results are not ideal.

SUMMARY OF THE INVENTION

It is therefore one of the objectives of the present invention to provide an image de-interlacing apparatus to solve the above problem.

According to an embodiment of the present invention, an image categorizing apparatus is disclosed. The image categorizing apparatus comprises: an edge detection module, for performing an edge detection operation on a plurality of pixels of an image so as to generate edge information corresponding to the image; and a statistics module, for performing a detection window based statistics operation on the edge information so as to generate statistics information corresponding to the image.

According to an embodiment of the present invention, an image categorizing method is further disclosed. The image categorizing method comprises: performing an edge detection operation on a plurality of pixels of an image so as to generate edge information corresponding to the image; and performing a detection window based statistics operation on the edge information so as to generate statistics information corresponding to the image.

According to an embodiment of the present invention, a de-interlacing apparatus is further disclosed. The de-interlacing apparatus comprises: an edge detection module, for performing an edge detection operation on a plurality of pixels of an image so as to generate edge information corresponding to the image; a statistics module, coupled to the edge detection module, for performing a detection window based statistics operation on the edge information so as to generate statistics information corresponding to the image; and an interpolation circuit, coupled to the statistics module, for interpolating the image according to the statistics information so as to generate an intra-field interpolation signal corresponding to the image.

According to an embodiment of the present invention, a de-interlacing method is further disclosed. The de-interlacing method comprises: performing an edge detection operation on a plurality of pixels of an image so as to generate edge information corresponding to the image; performing a detection window based statistics operation on the edge information so as to generate statistics information corresponding to the image; and interpolating the image according to the statistics information so as to generate an intra-field interpolation signal corresponding to the image.

According to an embodiment of the present invention, a de-interlacing apparatus is yet further disclosed. The de-interlacing apparatus comprises: an edge detection module, for performing an edge detection operation on a plurality of pixels of an image so as to generate edge information corresponding to the image; a statistics module, coupled to the edge detection module, for performing a detection window based statistics operation on the edge information so as to generate statistics information corresponding to the image; and a blending circuit, coupled to the statistics module, for determining a blending ratio of an intra-field interpolation operation to an inter-field interpolation operation on the image according to the statistics information so as to generate a de-interlaced image corresponding to the image.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 3 is an example of the categorizing rule followed by the detection window statistics unit shown in FIG. 2.

DETAILED DESCRIPTION

Figure 1:
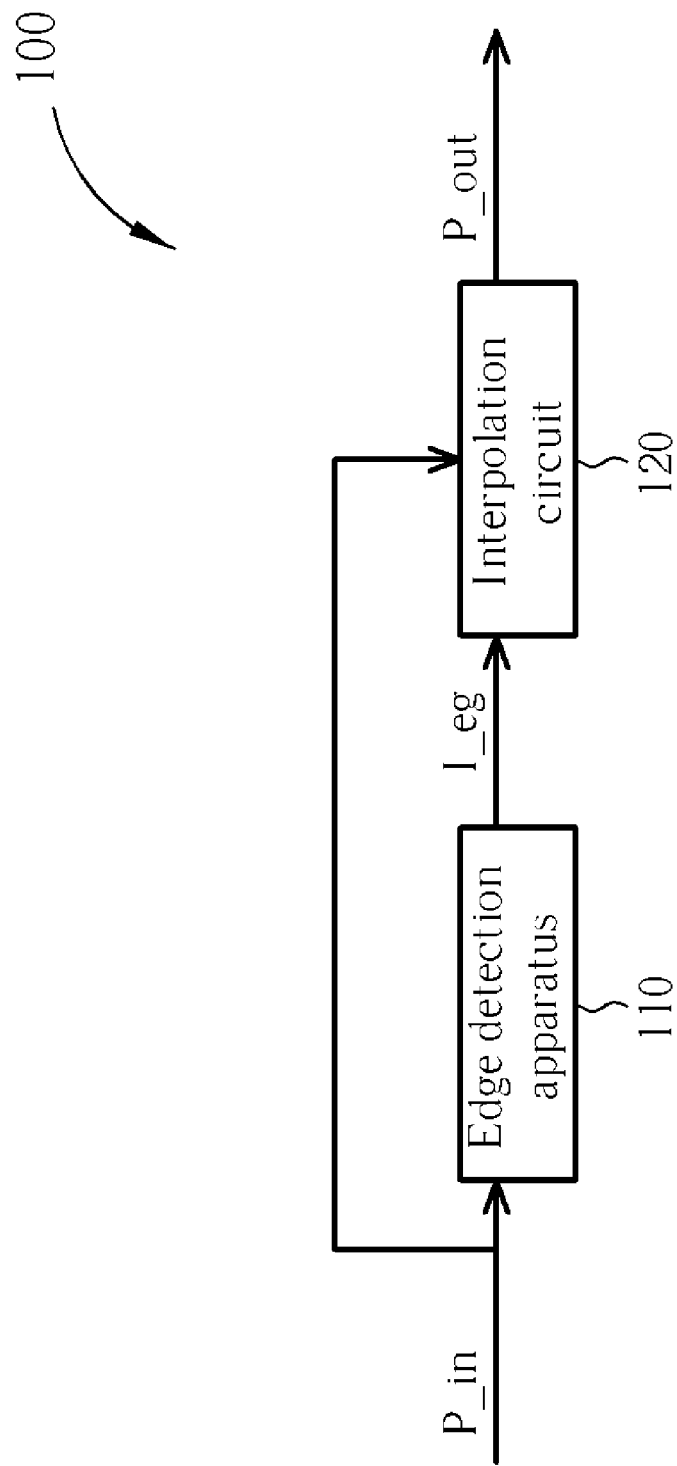
FIG. 1 is a system block diagram of a conventional de-interlacing apparatus.
Figure 2:
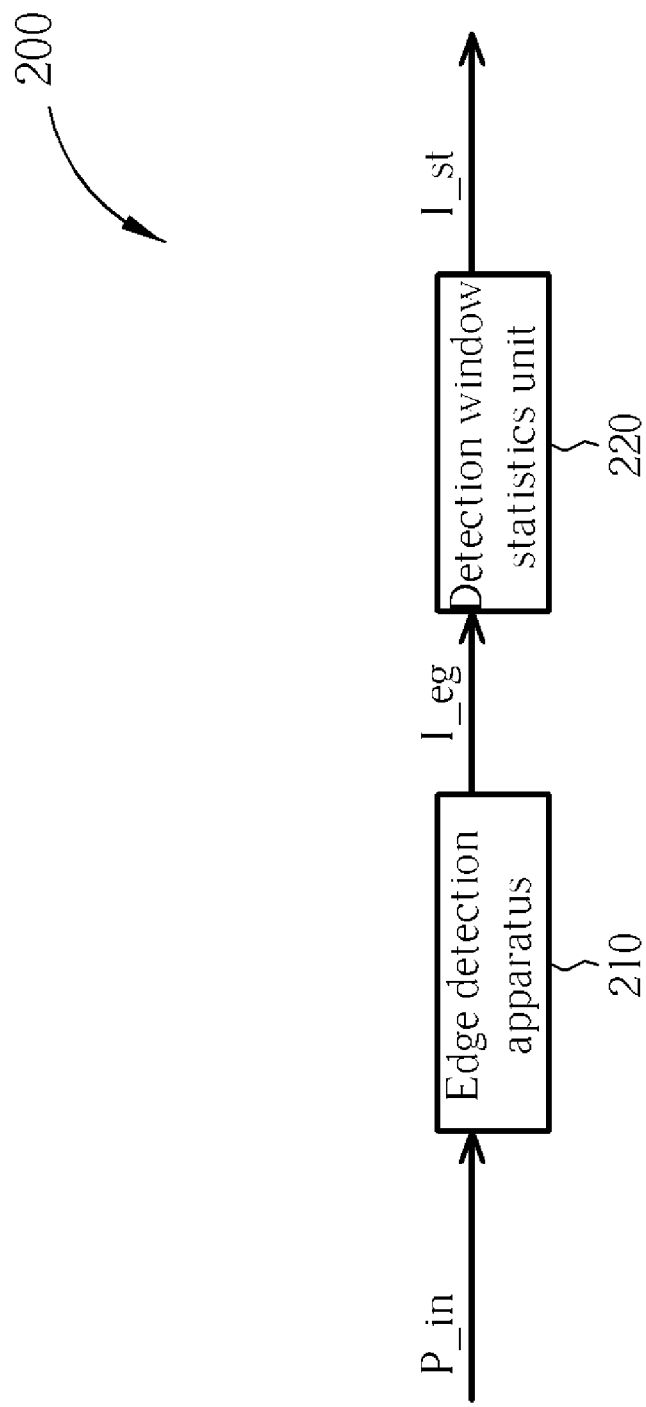
FIG. 2 is a system block diagram of an image categorizing apparatus according to an embodiment of the present invention.

Please refer to FIG. 2. FIG. 2 is a system block diagram of an image categorizing apparatus 200 according to an embodiment of the present invention. The image categorizing apparatus 200 includes an edge detection apparatus 210 and a detection window statistics unit 220. The edge detection apparatus 210 receives an input image P_in (for example, the input image P_in can be a field of a video data, wherein the field corresponds to a frame, and the input image P_in only includes a portion of scan lines of the frame), and then performs an edge detection operation on the input image P_in to categorize a plurality of pixels of the input image P_in, in order to generate edge information I_eg corresponding to the input image P_in. In this embodiment, the edge detection apparatus 210 can include an edge detection filter or a plurality of edge detection filters such as a Sobel filter or a Laplace filter. For each pixel of the input image P_in, each edge detection filter can be utilized to determine whether the pixel corresponds to a specific edge. For example, the edge detection apparatus 210 can be utilized to categorize each pixel of the input image P_in to be one of a vertical edge, a horizontal edge, a right tilted edge, a left tilted edge, and a non-edge via the edge detection filters.

The detection window statistics unit 220 performs a "detection window based statistics operation" on the edge information I_eg so as to categorize the pixels of the input image P_in, and the categorizations of the pixels of the input image P_in can be named as statistics information I_st. More specifically, for a specific pixel of the input image P_in, the detection window statistics unit 220 can utilize a plurality of pixels of a specific detection window (the specific detection window corresponds to the specific pixel) as statistical objects, in order to calculate categorized pixel numbers of each kind of edge in the specific detection window and then further categorize the specific pixel according to the statistical result. For example, the specific pixel can be a center of the specific detection window, and the specific detection window is a pixel window with size of M*N pixels, wherein both M and N are integers that are not smaller than one. The table shown in FIG. 3 is an example of a categorization rule followed by the detection window statistics unit 220 under condition of M=N=5, wherein TH1 and TH2 are two thresholds between 1 and 25, and "vertical tilted edge" includes three kinds of edges that are a vertical edge, a left tilted edge, and a right tilted edge.

Taking the table shown in FIG. 3 as an example, if the edge detection apparatus 210 determines a specific pixel corresponding to the vertical edge, but the detection window statistics unit 220 calculates a total number of non-edge pixels in the specific detection window corresponding to the specific pixel as larger than TH2, then the detection window statistics unit 220 can correct the categorizing result generated by the edge detection apparatus 210 for the specific pixel, and then let the specific pixel be further categorized as a smooth area. If the edge detection apparatus 210 determines a specific pixel corresponding to the horizontal edge, but all of the categorizing results of the pixels in the specific detection window corresponding to the specific pixel calculated by the detection window statistics unit 220 do not match the desired categorizing results of the smooth area, the vertical edge, and the horizontal edge, then the specific pixel can be further categorized as a mess area. Of course, after the detection window statistics unit 220 further generates the categorizing results, every categorizing result can be represented by a specific statistical categorizing value. For example, the four different values '0', '1', '2', and '3' can be utilized as the statistical categorizing values corresponding to four categorizing results of the smooth area, the vertical edge, the horizontal edge, and the mess area. Please note that utilizing the four different values '0', '1', '2', and '3' as the statistical categorizing values utilized by the detection window statistics unit 220 is only a simple example, and it is also practical to utilize other values as the statistical categorizing values utilized by the detection window statistics unit 220.

Figure 4:
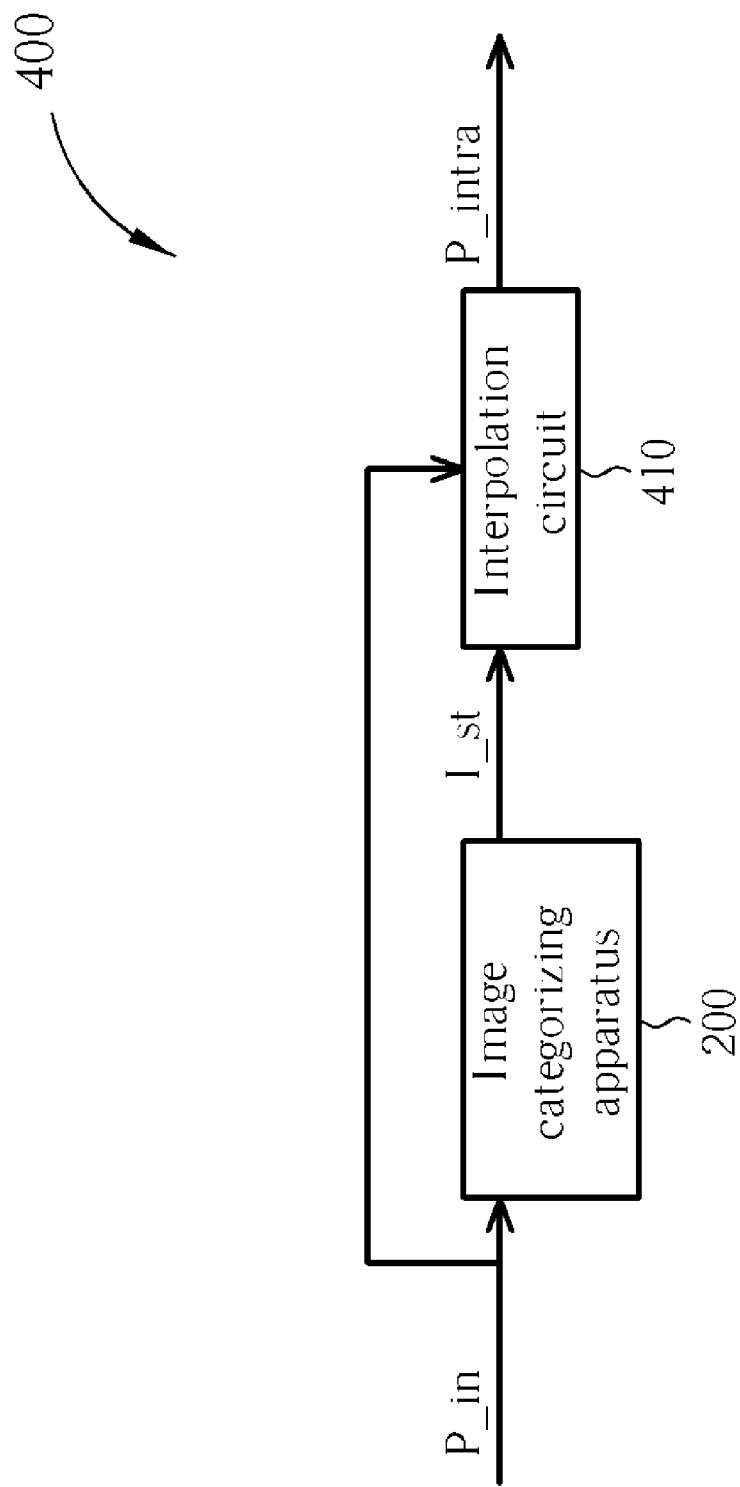
FIG. 4 is a system block diagram of a de-interlacing apparatus according to a first embodiment of the present invention.

Please refer to FIG. 4. FIG. 4 is a system block diagram of a de-interlacing apparatus 400 according to a first embodiment of the present invention. The de-interlacing apparatus 400 includes the image categorizing apparatus 200 shown in FIG. 2 and an interpolation circuit 410, wherein the interpolation circuit 410 is coupled to the image categorizing apparatus 200. The interpolation circuit 410 is utilized to perform an interpolation for the input image P_in according to the statistics information I_st generated by the image categorizing apparatus 200, in order to generate an intra-field interpolation signal P_intra (the intra-field interpolation signal P_intra includes the missing scan lines in the image P_in) corresponding to the input image P_in. More specifically, the interpolation circuit 410 selects an interpolation angle when performing the intra-field interpolation according to the statistics information I_st generated by the image categorizing apparatus 200 in order to generate the intra-field interpolation signal P_intra corresponding to the input image P_in by interpolation.

Figure 5:
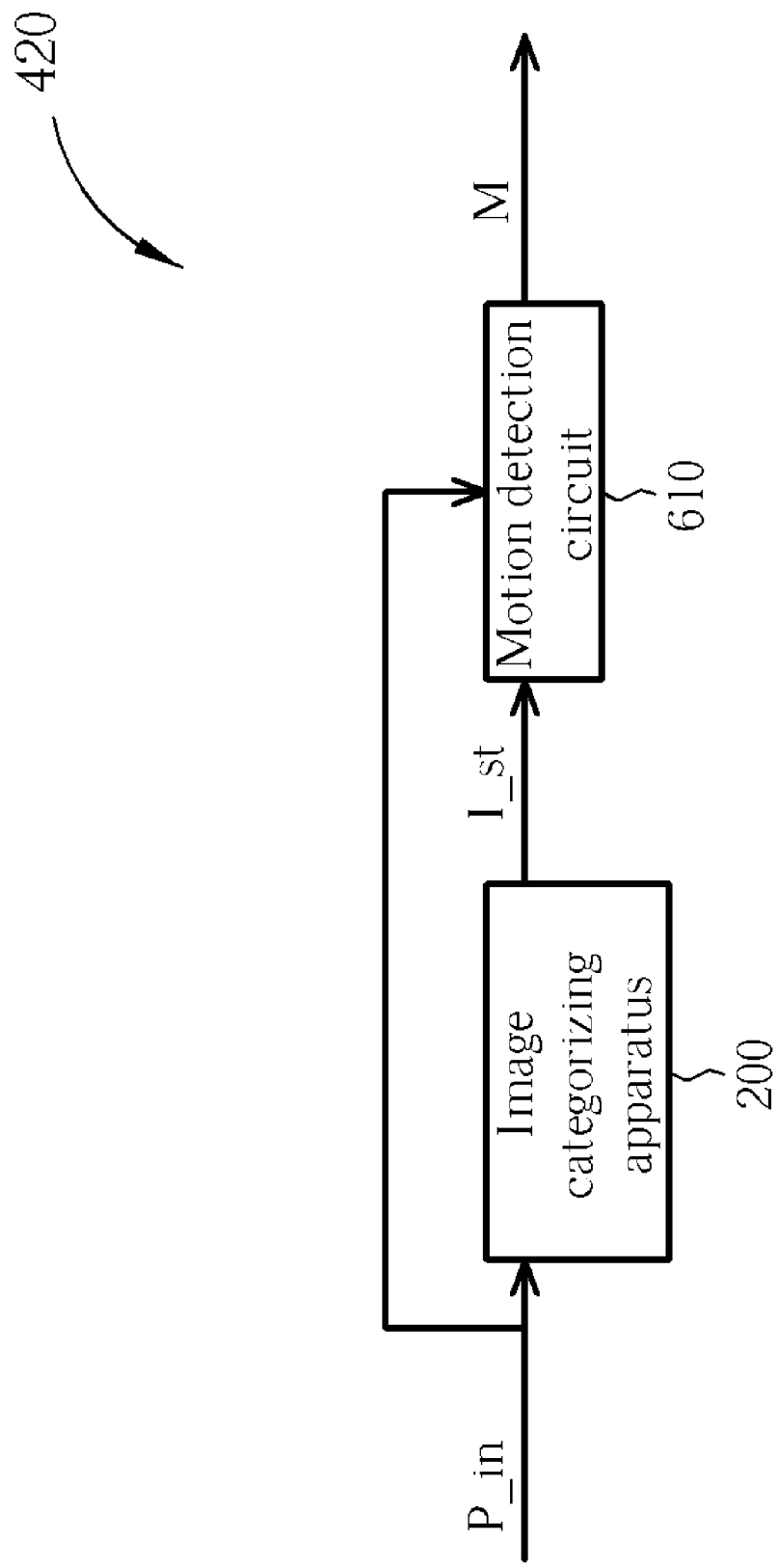
FIG. 5 is a block diagram of a motion detector utilized in the de-interlacing apparatus according to an embodiment of the present invention.

Please refer to FIG. 5. FIG. 5 is a block diagram of a motion detector 420 utilized in the de-interlacing apparatus according to an embodiment of the present invention. The motion detector 420 includes the image categorizing apparatus 200 shown in FIG. 2 and a motion detection circuit 610. The motion detection circuit 610 is utilized for receiving and detecting the input image P_in to generate a detection result, and for receiving the statistics information I_st outputted by the image categorizing apparatus 200, and then the motion detection circuit 610 utilizes a predetermined rule to determine which kind of image categorizing condition the detection result with the statistics information I_st matches, in order to generate motion information M. The predetermined rule mentioned above can be different according to the practical design requirements, and a person of ordinary skill in this technical field is able to set a required predetermined rule according to the description of the embodiment.

Figure 6:
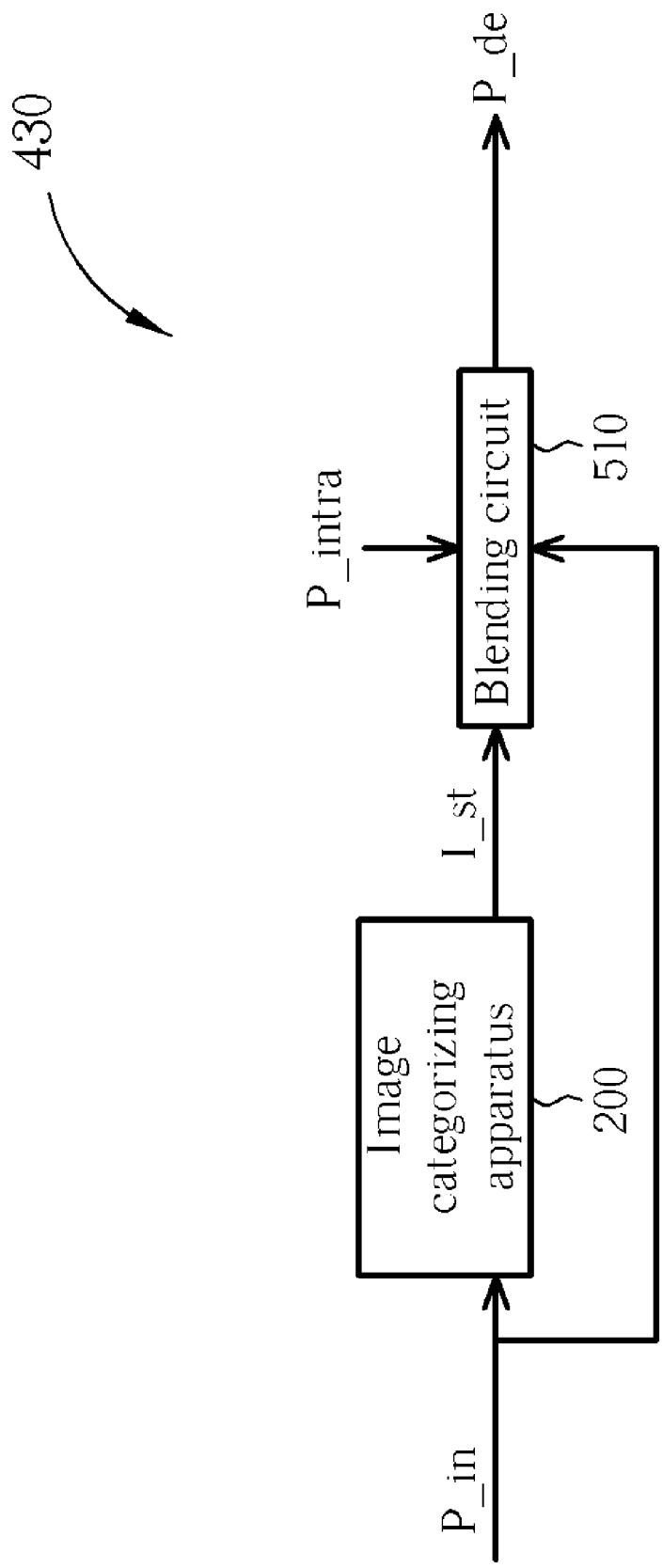
FIG. 6 is a block diagram of a mixer utilized in the de-interlacing apparatus according to an embodiment of the present invention.

Please refer to FIG. 6. FIG. 6 is a block diagram of a mixer 430 utilized in the de-interlacing apparatus according to an embodiment of the present invention. The mixer 430 includes the image categorizing apparatus 200 shown in FIG. 2 and a blending circuit 510. The blending circuit 510 is utilized for receiving the statistics information I_st and an intra-field interpolation signal P_intra outputted by the image categorizing apparatus 200. In addition, the blending circuit 510 utilizes image P_prev (not shown) prior to the input image P_in and image P_next (not shown) after the input image P_in to perform an inter-field Interpolation in order to generate an inter-field Interpolation signal P_inter (not shown). The blending circuit 510 further sets weighted values of the intra-field interpolation signal P_intra and the inter-field Interpolation signal P_inter according to the statistics information I_st in order to adjust a blending ratio of the intra-field interpolation signal P_intra to the inter-field Interpolation signal P_inter, so as to mix the intra-field interpolation signal P_intra and the inter-field Interpolation signal P_inter to generate a de-interlaced image P_de corresponding to the input image P_in (for example, the de-interlaced image P_de includes the missing scan lines in the image P_in). The setting of the weighted values mentioned above can be different according to the practical design requirements, and a person of ordinary skill in this technical field is able to make the blending circuit 510 set the proper weighted values according to the description of the embodiment.

Figure 7:
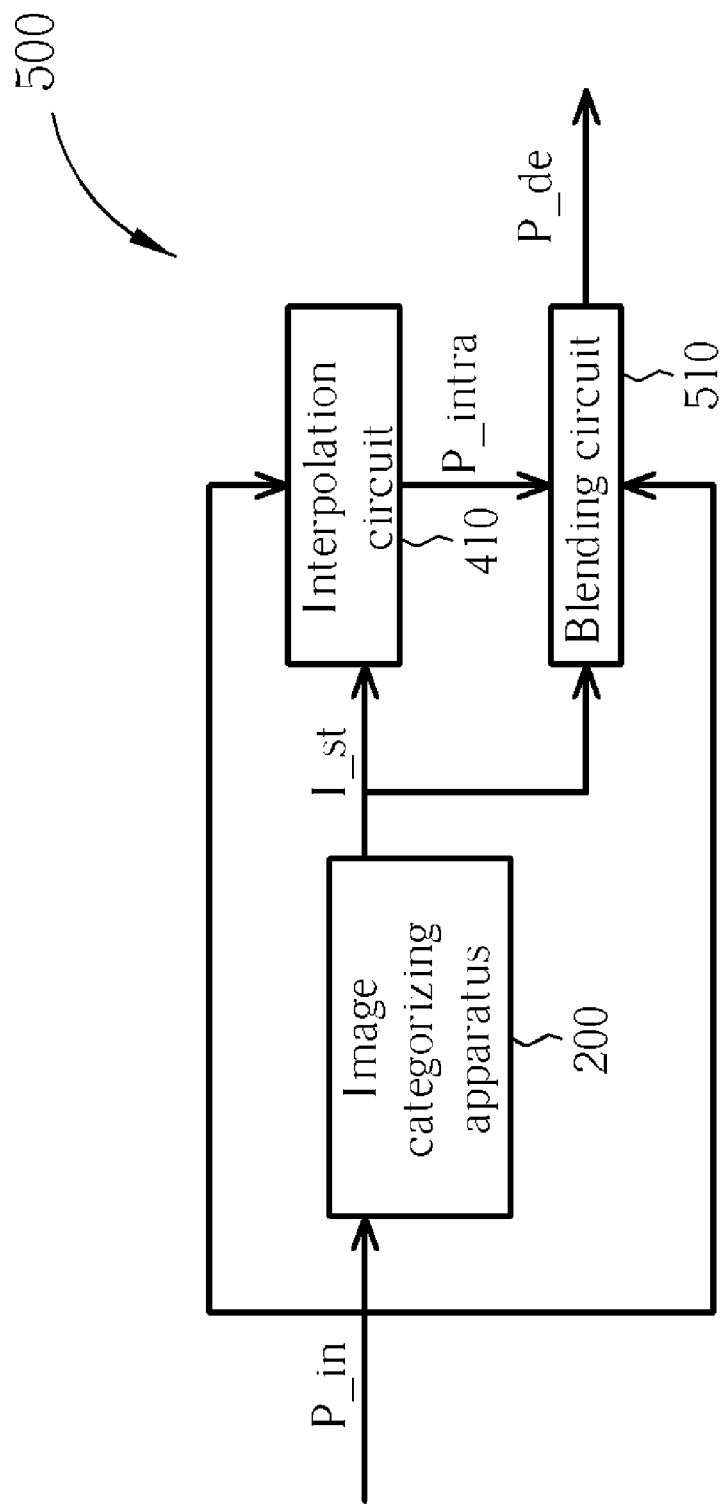
FIG. 7 is a system block diagram of a de-interlacing apparatus according to a second embodiment of the present invention.

Please refer to FIG. 7. FIG. 7 is a system block diagram of a de-interlacing apparatus 500 according to a second embodiment of the present invention. The de-interlacing apparatus 500 includes the image categorizing apparatus 200 shown in FIG. 2, the interpolation circuit 410, and the blending circuit 510, wherein the image categorizing apparatus 200 and the interpolation circuit 410 are the same as the first embodiment shown in FIG. 4, and therefore details of the functions of these two components are omitted for the sake of brevity. The blending circuit 510 utilizes image P_prev (not shown) prior to the input image P_in and image P_next (not shown) after the input image P_in to perform an inter-field Interpolation in order to generate an inter-field Interpolation signal P_inter (not shown) corresponding to the input image P_in. In addition, the blending circuit 510 further receives the intra-field interpolation signal P_intra and determines a blending ratio of the intra-field interpolation signal P_intra to the inter-field Interpolation signal P_inter according to the statistics information I_st. In other words, the blending circuit 510 sets weighted values of the intra-field interpolation signal P_intra and the inter-field Interpolation signal P_inter according to the statistics information I_st in order to mix the intra-field interpolation signal P_intra and the inter-field Interpolation signal P_inter so as to generate a de-interlaced image P_de corresponding to the input image P_in (for example, the de-interlaced image P_de includes the missing scan lines in the image P_in). In other words, the de-interlaced image P_de outputted in the end can be a result including intra-field interpolation information and the inter-field Interpolation information.

Figure 8:
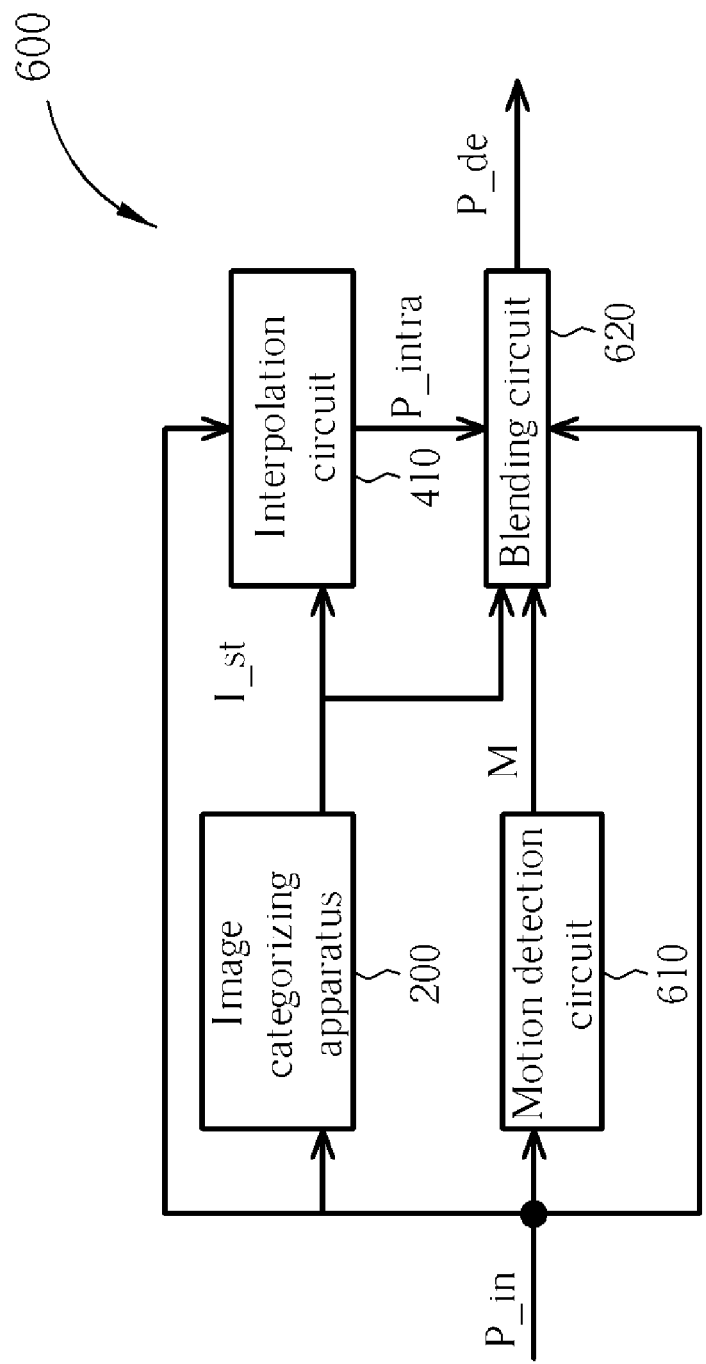
FIG. 8 is a system block diagram of a de-interlacing apparatus according to a third embodiment of the present invention.

Please refer to FIG. 8. FIG. 8 is a system block diagram of a de-interlacing apparatus 600 according to a third embodiment of the present invention. The de-interlacing apparatus 600 includes the image categorizing apparatus 200 shown in FIG. 2, the interpolation circuit 410, a blending circuit 620, and the motion detection circuit 610, wherein the image categorizing apparatus 200 and the interpolation circuit 410 are the same as the first and second embodiments, and therefore details of the functions of these two components are omitted for the sake of brevity. The motion detection circuit 610 is utilized for detecting the input image P_in to generate motion information M, and for providing the motion information M to the blending circuit 620. The blending circuit 620 utilizes image P_prev (not shown) prior to the input image P_in and image P_next (not shown) after the input image P_in to perform an inter-field Interpolation in order to generate an inter-field Interpolation signal P_inter (not shown) corresponding to the input image P_in. In addition, the blending circuit 620 further sets weighted values of the intra-field interpolation signal P_intra and the inter-field Interpolation signal P_inter during mixing process according to the statistics information I_st and the motion information M in order to adjust a blending ratio of the intra-field interpolation signal P_intra to the inter-field Interpolation signal P_inter, so as to mix the intra-field interpolation signal P_intra and the inter-field Interpolation signal P_inter to generate a de-interlaced image P_de corresponding to the input image P_in (for example, the de-interlaced image P_de includes the missing scan lines in the image P_in). In other words, the de-interlaced image P_de outputted in the end is a preferred de-interlaced image.

Figure 9:
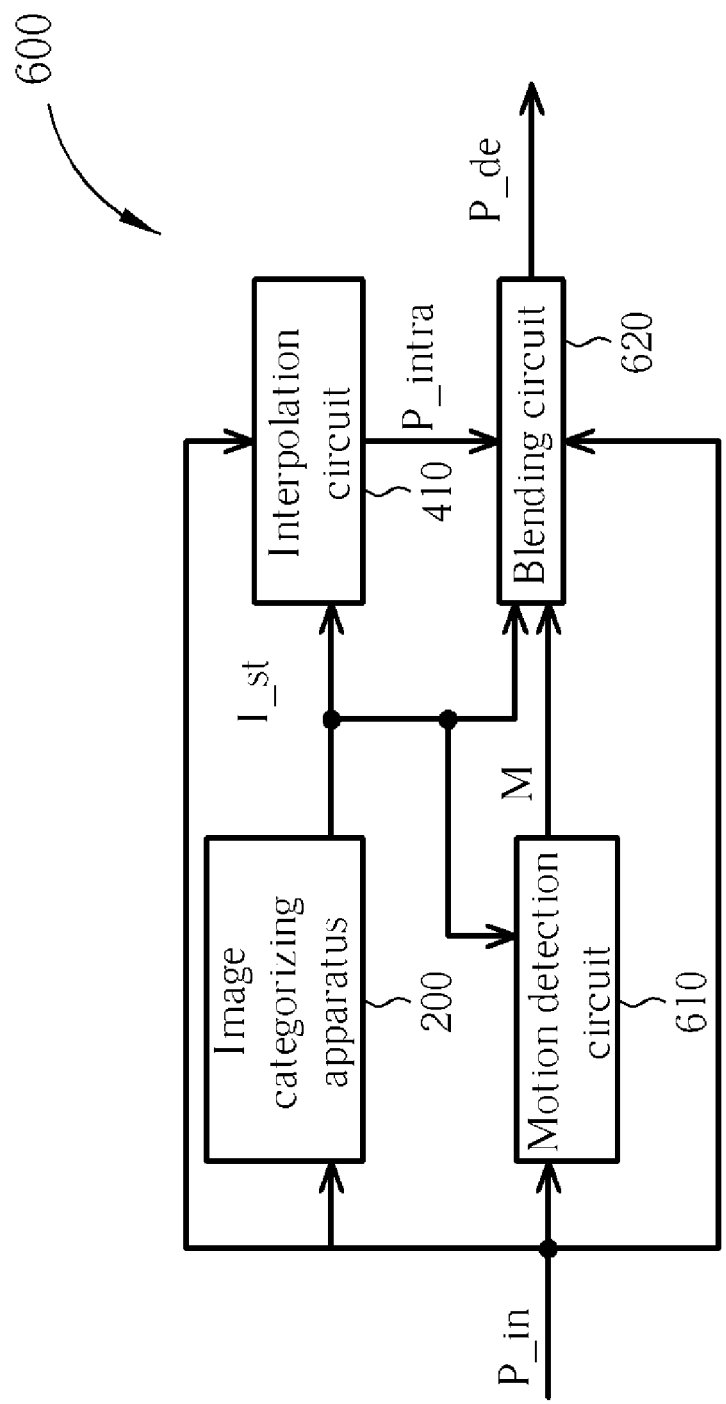
FIG. 9 is a system block diagram of a de-interlacing apparatus according to a fourth embodiment of the present invention.

Please refer to FIG. 9. FIG. 9 is another embodiment of the present invention. The main difference between the embodiment shown in FIG. 8 and this embodiment shown in FIG. 9 is that the motion detection circuit 610 further receives the statistics information I_st to take the statistics information I_st as an additional reference when generating the motion information M. For example, when the motion detection circuit 610 detects the input image P_in to generate a detection result and the motion detection circuit 610 receives the statistics information I_st, the motion detection circuit 610 is able to utilize a predetermined rule to determine which kind of image categorizing condition the detection result with the statistics information I_st matches, in order to generate the motion information M and output the motion information M to the blending circuit 620. Then, the blending circuit 620 is able to adjust a blending ratio of the intra-field interpolation signal P_intra to the inter-field Interpolation signal P_inter by referring to the motion information M, so as to mix the intra-field interpolation signal P_intra and the inter-field Interpolation signal P_inter to generate a de-interlaced image P_de corresponding to the input image P_in (for example, the de-interlaced image P_de includes the missing scan lines in the image P_in). The predetermined rule mentioned above can be different according to the practical design requirements, and a person of ordinary skill in this technical field is able to set a required predetermined rule according to the description of the embodiment.

In addition, in the embodiment shown in FIG. 9, it is also practical for the blending circuit 620 to adjust a blending ratio of the intra-field interpolation signal P_intra to the inter-field Interpolation signal P_inter by referring to the motion information M only, and without referring to the statistics information I_st.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image categorizing apparatus, comprising:
    an edge detection module, for performing an edge detection operation on a plurality of pixels of an image so as to generate edge information corresponding to the image, wherein the edge detection module is embodied at least partially in tangible circuitry; and
    a statistics module, for performing a detection window based statistics operation on the edge information so as to generate statistics information corresponding to the image, wherein the statistics module is embodied at least partially in tangible circuitry and further operates to use a plurality of pixels of a specific detection window as statistical objects, in order to calculate categorized pixel numbers of each kind of edge in the specific detection window and then further categorize a specific pixel according to the statistical result.

2. The image categorizing apparatus of claim 1, wherein the edge detection module is utilized to categorize each pixel of the image to be one of a vertical edge, a horizontal edge, a right tilted edge, a left tilted edge, and a non-edge.

3. The image categorizing apparatus of claim 1, wherein the edge detection module comprises at least an edge detection filter.

4. The image categorizing apparatus of claim 1, wherein the statistics module calculates categorized pixel numbers of each kind of edge in a specific detection window corresponding to a specific pixel of the image to generate a statistical result and then further categorizes the specific pixel according to the statistical result.

5. The image categorizing apparatus of claim 4, wherein the specific pixel is substantially a center of the specific detection window.

6. An image categorizing method executed by a tangible processor, comprising:
    performing an edge detection operation by the processor on a plurality of pixels of an image so as to generate edge information corresponding to the image; and
    performing a detection window based statistics operation by the processor on the edge information so as to generate statistics information corresponding to the image, wherein the statistics operation uses a plurality of pixels of a specific detection window as statistical objects, in order to calculate categorized pixel numbers of each kind of edge in the specific detection window and then further categorize a specific pixel according to the statistical result.

7. The image categorizing method of claim 6, wherein the edge detection operation is utilized to categorize each pixel of the image to be one of a vertical edge, a horizontal edge, a right tilted edge, a left tilted edge, and a non-edge.

8. The image categorizing method of claim 6, wherein the step of performing the detection window based statistics operation comprises:
calculating categorized pixel numbers of each kind of edge in a specific detection window corresponding to a specific pixel of the image to generate a statistical result, and then further categorizing the specific pixel according to the statistical result.

9. A de-interlacing apparatus, comprising:
an image categorizing apparatus, comprising:
an edge detection module, for performing an edge detection operation on a plurality of pixels of an image so as to generate edge information corresponding to the image, wherein the edge detection module is embodied at least partially in tangible circuitry; and
a statistics module, coupled to the edge detection module, for performing a detection window based statistics operation on the edge information so as to generate statistics information corresponding to the image, wherein the statistics module is embodied at least partially in tangible circuitry and further operates to use a plurality of pixels of a specific detection window as statistical objects, in order to calculate categorized pixel numbers of each kind of edge in the specific detection window and then further categorize a specific pixel according to the statistical result; and
an interpolation circuit, coupled to the statistics module, for performing an interpolation upon the image according to the statistics information so as to generate an intra-field interpolation signal corresponding to the image.

10. The de-interlacing apparatus of claim 9, further comprising:
a blending circuit, coupled to the statistics module and the interpolation circuit, for determining a blending ratio of an intra-field interpolation operation on the image to an inter-field interpolation operation on the image according to the statistics information so as to generate a de-interlaced image corresponding to the image.

11. The de-interlacing apparatus of claim 10, further comprising:
a motion detection circuit, coupled to the blending circuit, for detecting the image to generate motion information, wherein the blending circuit determines the blending ratio according to the statistics information and the motion information so as to generate the de-interlaced image corresponding to the image.

12. The de-interlacing apparatus of claim 9, wherein the edge detection module comprises at least an edge detection filter.

13. The de-interlacing apparatus of claim 9, wherein the statistics module calculates categorized pixel numbers of each kind of edge in a specific detection window corresponding to a specific pixel of the image to generate a statistical result and then further categorizes the specific pixel according to the statistical result.

14. A de-interlacing method, comprising:
performing an edge detection operation on a plurality of pixels of an image so as to generate edge information corresponding to the image;
performing a detection window based statistics operation on the edge information so as to generate statistics information corresponding to the image, wherein the statistics operation uses a plurality of pixels of a specific detection window as statistical objects, in order to calculate categorized pixel numbers of each kind of edge in the specific detection window and then further categorize a specific pixel according to the statistical result; and
performing an interpolation upon the image according to the statistics information so as to generate an intra-field interpolation signal corresponding to the image.

15. The de-interlacing method of claim 14, further comprising:
determining a blending ratio of an intra-field interpolation operation on the image to an inter-field interpolation operation on the image according to the statistics information so as to generate a de-interlaced image corresponding to the image.

16. The de-interlacing method of claim 15, further comprising:
detecting the image to generate motion information, wherein the blending ratio is determined according to the statistics information and the motion information so as to generate the de-interlaced image corresponding to the image.

17. The de-interlacing method of claim 14, wherein the detection window based statistics operation comprises calculating categorized pixel numbers of each kind of edge in a specific detection window corresponding to a specific pixel of the image to generate a statistical result and then categorizing the specific pixel according to the statistical result.

18. A de-interlacing apparatus, comprising:
an image categorizing apparatus, comprising:
an edge detection module, for performing an edge detection operation on a plurality of pixels of an image so as to generate edge information corresponding to the image, wherein the edge detection module is embodied at least partially in tangible circuitry; and
a statistics module, coupled to the edge detection module, for performing a detection window based statistics operation on the edge information so as to generate statistics information corresponding to the image, wherein the statistics module is embodied at least partially in tangible circuitry and further operates to use a plurality of pixels of a specific detection window as statistical objects, in order to calculate categorized pixel numbers of each kind of edge in the specific detection window and then further categorize a specific pixel according to the statistical result; and
a blending circuit, coupled to the statistics module, for determining a blending ratio of an intra-field interpolation operation on the image to an inter-field interpolation operation on the image according to the statistics information so as to generate a de-interlaced image corresponding to the image.

19. The de-interlacing apparatus of claim 18, wherein the edge detection module comprises at least an edge detection filter.

20. The de-interlacing apparatus of claim 18, wherein the statistics module calculates categorized pixel numbers of each kind of edge in a specific detection window corresponding to a specific pixel of the image to generate a statistical result and then further categorizes the specific pixel according to the statistical result.

* * * * *